A. L. SOHM.
PROGRAM DEVICE.
APPLICATION FILED MAY 21, 1917.

1,317,109.

Patented Sept. 23, 1919.
10 SHEETS—SHEET 1.

Witnesses:
Leonard W. Novander
John A. Dirmer

Inventor
Alfred L. Sohm
By Brown, Hanson & Boettcher
Att'ys

A. L. SOHM.
PROGRAM DEVICE.
APPLICATION FILED MAY 21, 1917.

1,317,109.

Patented Sept. 23, 1919.
10 SHEETS—SHEET 2.

Witnesses:
Leonard W. Novander
Cameron A. Whitsitt

Inventor
Alfred L. Sohm
By Brown, Hanson & Boettcher
Att'ys

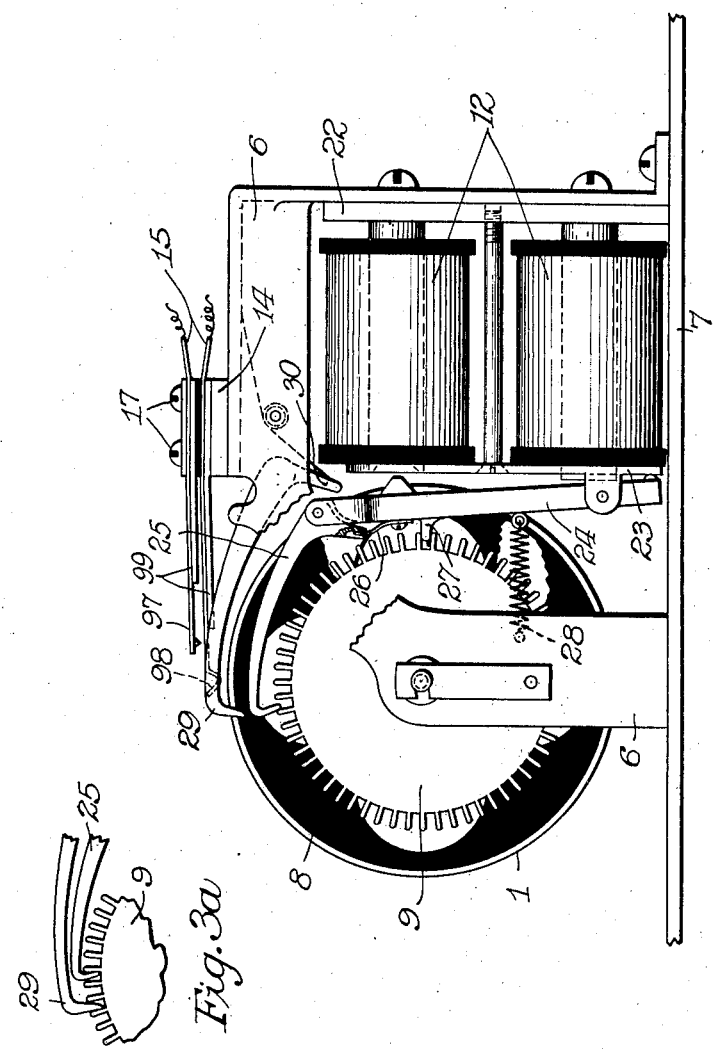

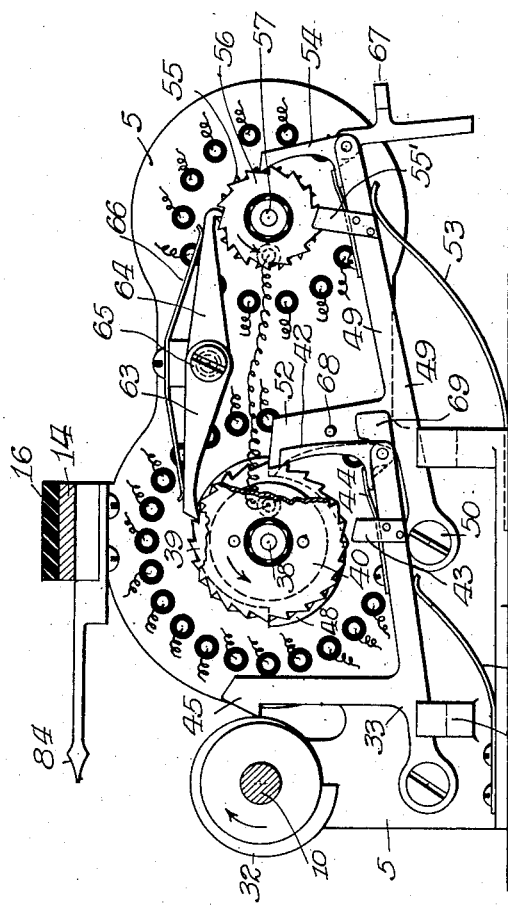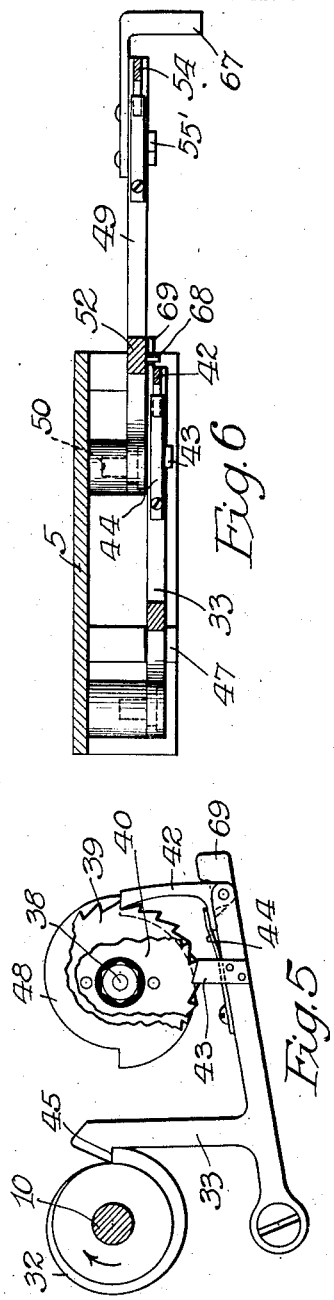

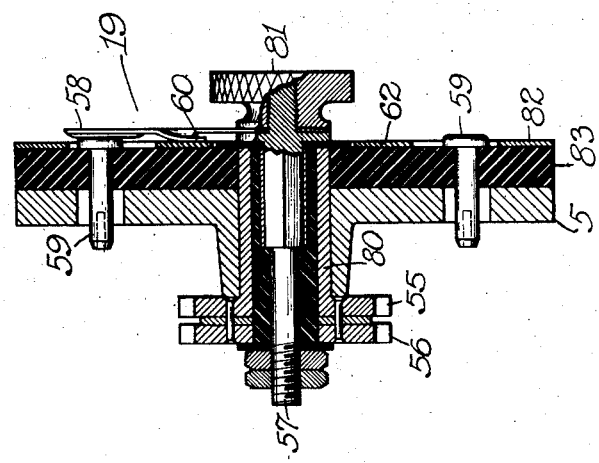
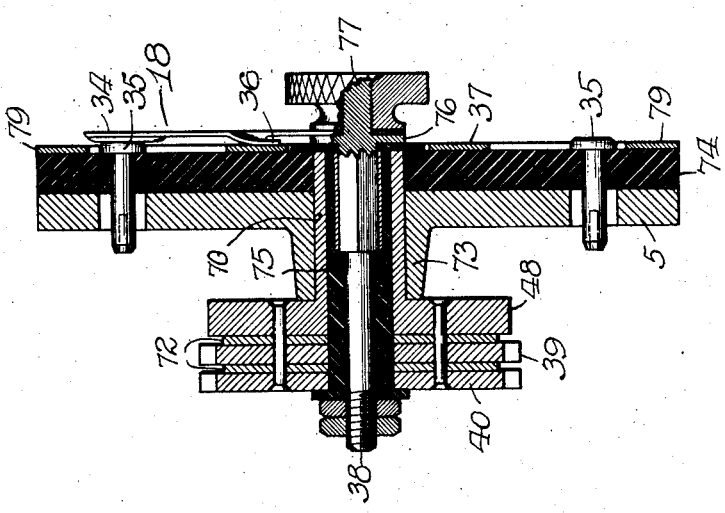

A. L. SOHM.
PROGRAM DEVICE.
APPLICATION FILED MAY 21, 1917.
1,317,109.
Patented Sept. 23, 1919.
10 SHEETS—SHEET 6.
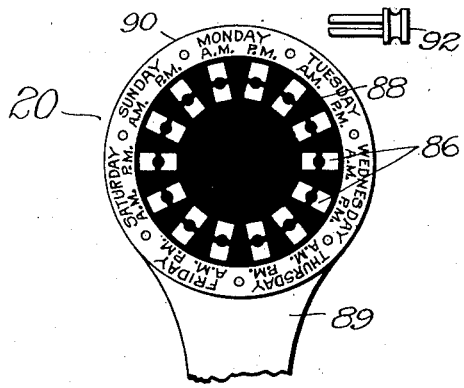
Fig. 11
Fig. 11a
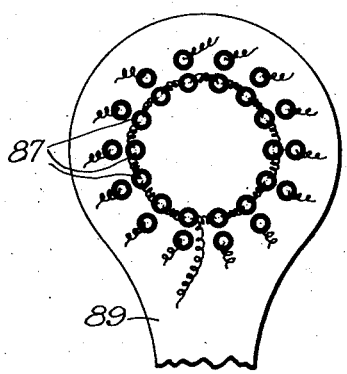
Fig. 12
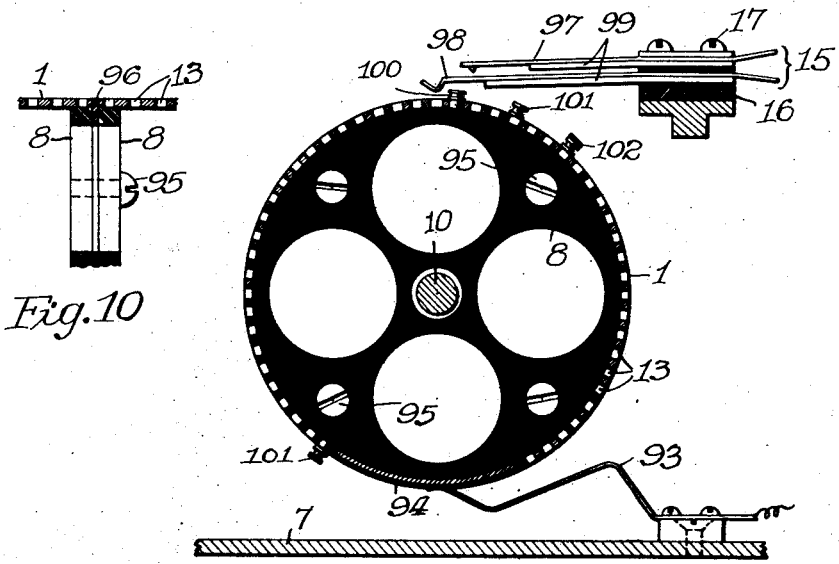
Fig. 10
Fig. 9
Witnesses:
Leonard W. Novander
Cameron A. Whitsett
Inventor
Alfred L. Sohm
By Brown, Hanson & Battelle
Att'ys

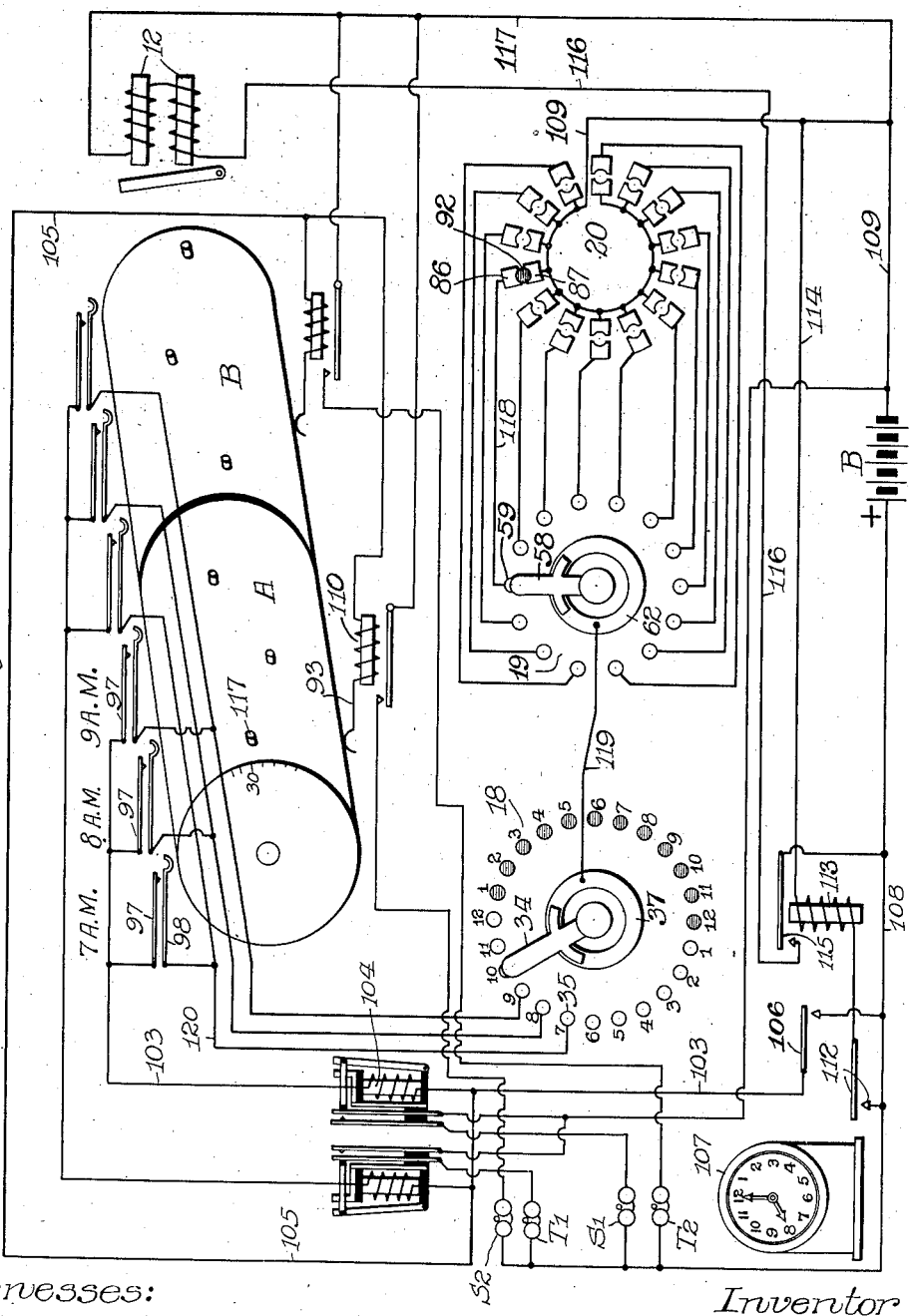

A. L. SOHM.
PROGRAM DEVICE.
APPLICATION FILED MAY 21, 1917.

1,317,109.

Patented Sept. 23, 1919.
10 SHEETS—SHEET 8.

Fig. 14.

Witnesses
Leonard W. Novander
John H. Dienner

Inventor
Alfred L. Sohm
By Brown, Hansen & Boettcher
Att'ys

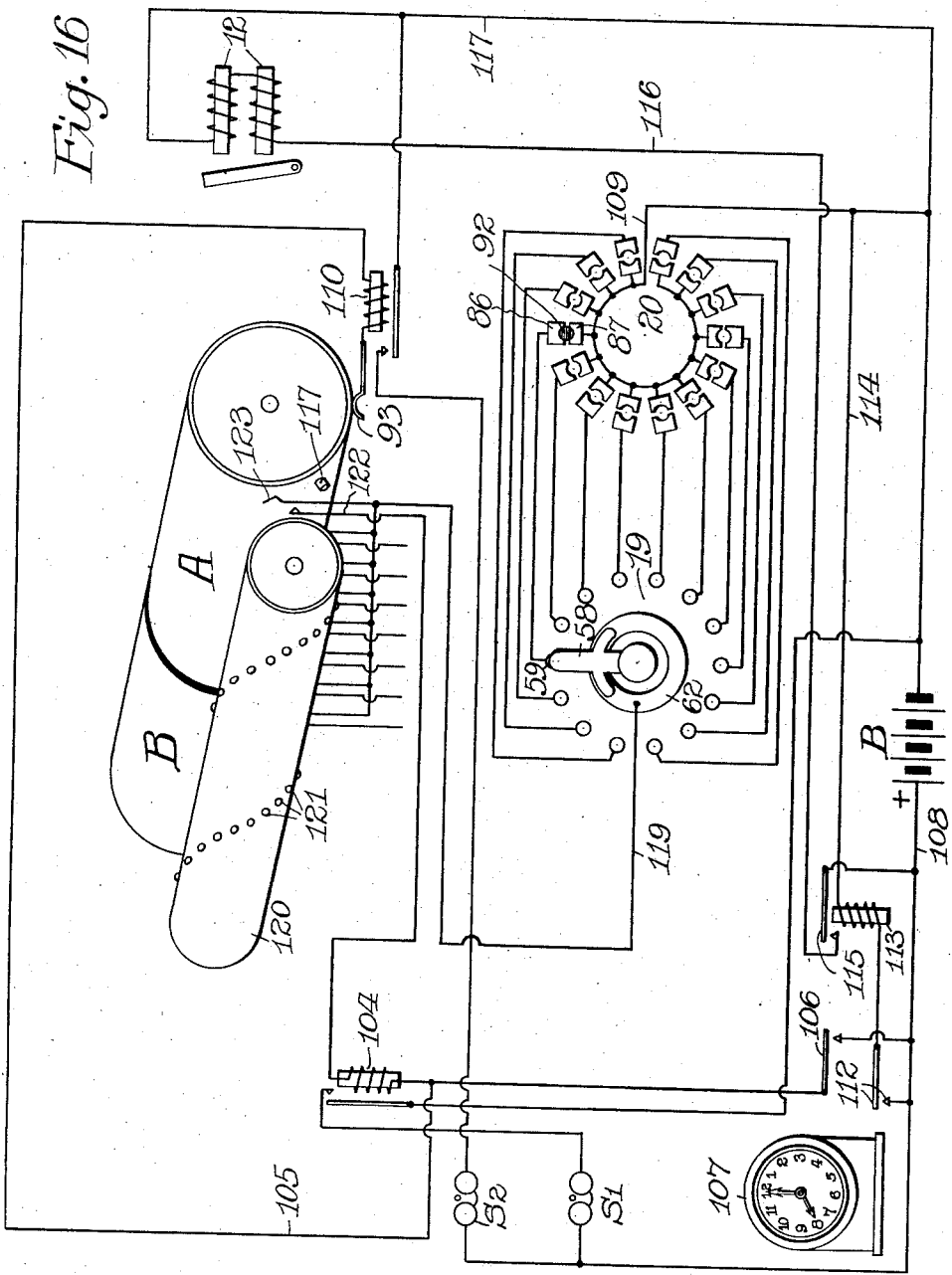

UNITED STATES PATENT OFFICE.

ALFRED L. SOHM, OF CHICAGO, ILLINOIS, ASSIGNOR TO SOHM ELECTRIC COMPANY, OF CHICAGO, ILLINOIS, A CORPORATION OF ILLINOIS.

PROGRAM DEVICE.

1,317,109.     Specification of Letters Patent.     Patented Sept. 23, 1919.

Application filed May 21, 1917. Serial No. 169,872.

*To all whom it may concern:*

Be it known that I, ALFRED L. SOHM, a citizen of the United States, residing at Chicago, in the county of Cook and State of Illinois, have invented certain new and useful Improvements in Program Devices, of which the following is a full, clear, concise, and exact description, reference being had to the accompanying drawings, forming a part of this specification.

The subject matter of this invention is a program device.

The invention provides means for giving a signal or signals at predetermined times, as, for instance, in accordance with the program periods in a school, or in accordance with train schedules when a train or trains are to leave the depot, and the like.

It is one of the objects of this invention to provide means for selectively actuating part or all of said signals as desired at any given time or times.

A further object is to provide means allowing disabling of the signals for a predeterminable time in each week, and a still further object is to provide a program device of improved mechanical and electrical construction.

In the accompanying drawings—

Fig. 3 is a partial end elevation viewed from the right of Fig. 1;

Figure 1:
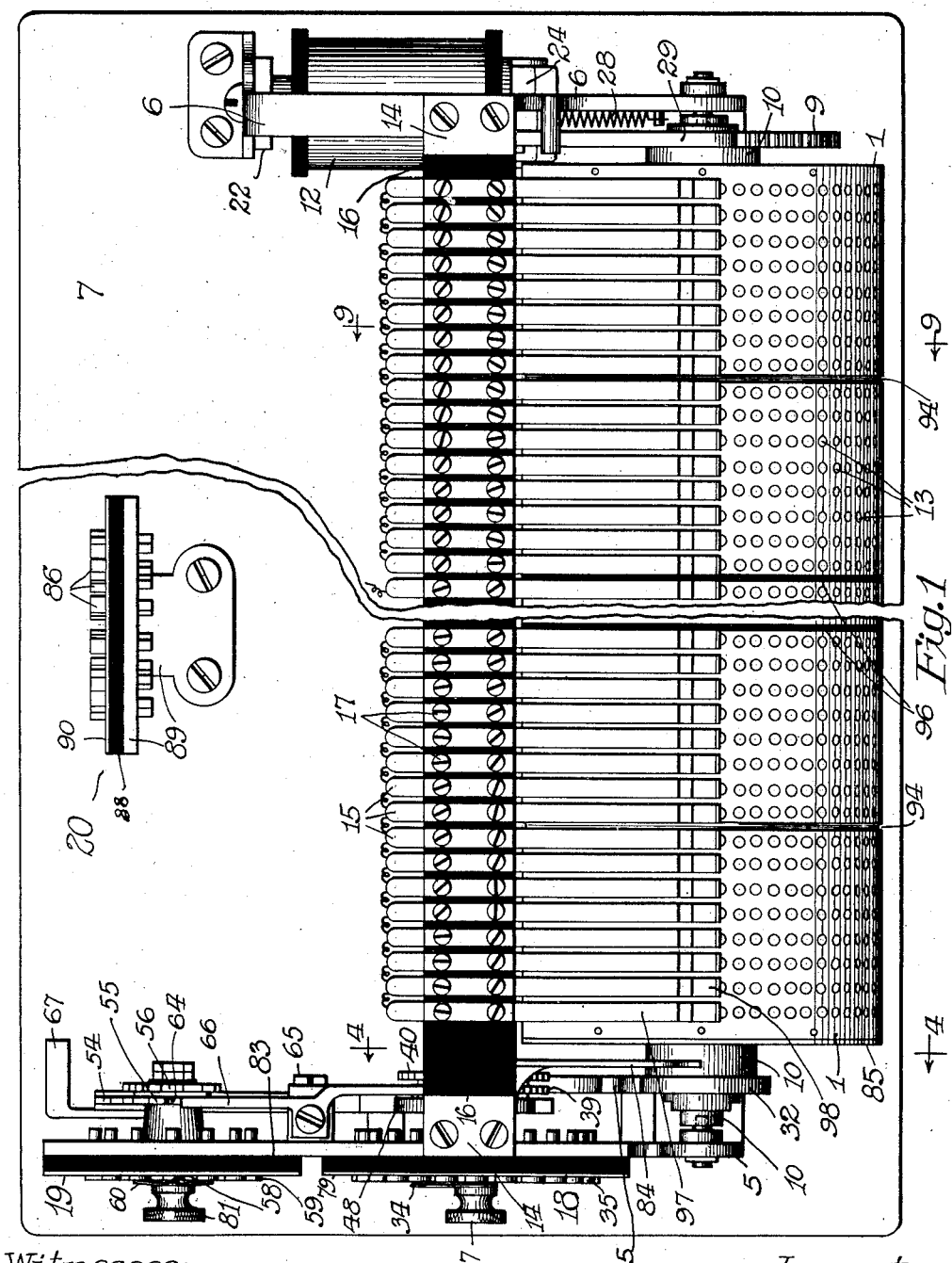
Figure 1 is a plan view of a code ringing device embodying my invention.
Figure 15:
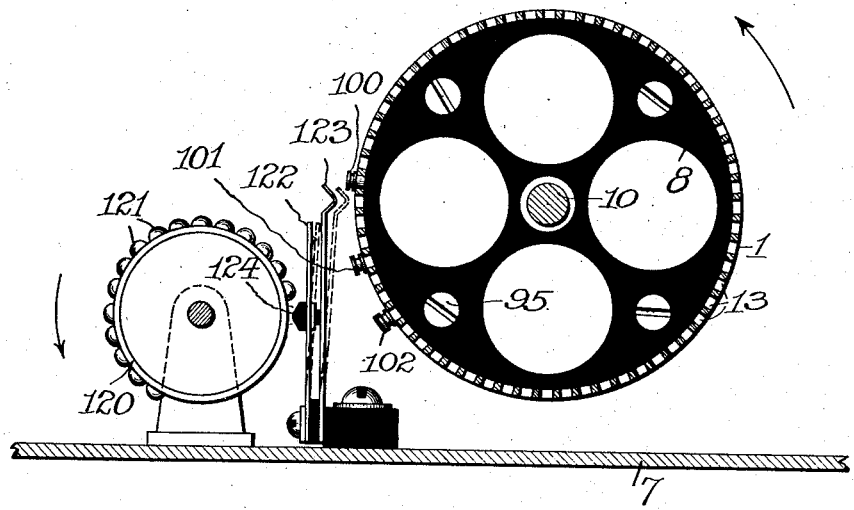

Fig. 3ª is a fragmentary detail view showing part of the mechanism of Fig. 3 in operated position;

Fig. 4 is a cross-sectional view taken on the line 4—4 of Fig. 1;

Fig. 5 is a fragmentary detail view of the snail cam and ratchet mechanism for advancing the wipers on the bank of hour contacts;

Fig. 6 is a plan view with parts broken away of the pawl mechanism shown in Fig. 4 for advancing the wipers on the banks of hour and half day selecting contacts;

Fig. 7 is a cross section of the bank of half day selecting contacts and the ratchet mechanism;

Fig. 8 is a similar view of the hour selecting switch;

Fig. 9 is a cross sectional view of the barrel taken on approximately the line 9—9 of Fig. 1;

Fig. 10 is a fragmentary detail view showing the manner of attaching the adjacent edges of the barrel sections;

Fig. 11 is a front elevation of the bank of half day bridge contacts shown in plan view at the top of Fig. 1;

Fig. 11ª is a detail view showing the plug for bridging the half day contacts;

Fig. 12 is a rear elevation of the structure shown in Fig. 11;

Fig. 13 is a diagram of connections for a two-section program device;

Fig. 14 is a plan view, partially broken away, of a modification;

Fig. 15 is a cross-section of the structure shown in Fig. 14; and

Fig. 16 is a circuit diagram for the modification shown in Figs. 14 and 15.

In the device shown in the accompanying drawings, provision is made for ringing either one of two sets of bells at a given time, or for ringing both sets at once.

It is often desirable, in giving signals, to discontinue the signals for a given day or half day, and provision is made for setting the mechanism so that, for instance, on each Sunday or Saturday afternoon, no bells will be rung. It is to be noted in this connection that other signals than bells may be employed, if preferred.

In the structure shown in the accompanying drawings, a barrel or drum 1, consisting of a number of sections, of which two and part of another are shown in Fig. 1, is mounted in standards 5 and 6 rising from the base 7 of the machine. The barrel sections are insulated from the shaft by means of the end plates 8 (see Figs. 2 and 3). A square toothed ratchet wheel 9 is fastened to the shaft 10 of the barrel, and an electromagnet 12, controlled by a time clock, operates the ratchet wheel to advance the drum at regular intervals.

Each one of the drum sections is provided with a plurality of rows of holes. In Fig. 1 I have shown 16 rows of holes 13, corresponding to the hours from 7 a. m. to 10 p. m., inclusive. If it is desired to send signals throughout the entire twenty-four hours, the drum sections should each be provided with 24 rows of holes. These holes form sockets, into which pins of various characteristics, as will later be described, may be fitted. A cross bar 14 is attached to the end plates or standards 5 and 6, and upon this cross bar are mounted pairs of springs 15, each pair corresponding to a row of holes 13 and adapted to engage the pins which may be inserted in the holes 13.

The springs 15 may be attached to a strip of insulation 16 as by the screws 17 or in any other suitable manner. The holes 13 are arranged in regularly spaced order circumferentially, to correspond to the minutes in an hour. That is, there are sixty holes evenly distributed in each row and the electromagnets 12 are energized once a minute in order to advance the drum a complete rotation in an hour.

The drum coöperates with an hour selecting switch 18 which will later be described, and a half day selecting switch 19 which will also be described later. At the back of the drum a half day cutout switch 20 is attached to the base 7, this cutout switch being useful for determining the days or half days upon which the signals may be continued or discontinued. The mechanism by which the stepping action is secured is shown in Fig. 3. The electromagnets 12 are connected by means of a magnetic yoke 22 to the end plate or standard 6. The free ends of the electromagnet cores are connected by a non-magnetic yoke 23 which serves as a pivotal mounting for the armature 24. Upon the upper end of the armature is mounted a pawl 25 held by the spring 26 to engage normally the teeth of the wheel 9. The projection 27 mounted on the back of the armature 24 is held in engagement with the teeth of the wheel 9 by means of the spring 28 when the armature 24 is retracted. Pivoted on the end plate 6 adjacent the end of the armature 24 is a holding pawl 29 which is brought into engagement with the teeth of the ratchet wheel 9 when the armature is attracted. When the armature 24 is attracted, the upper end thereof upon which the pawl 25 is mounted, strikes the tail 30 of the pawl 29, bringing the nose of the pawl into engagement with a tooth on the ratchet wheel 9. Thus, the pawl 29 serves as an overthrow preventing device, which is released as soon as the armature 24 is retracted; the projection 27 becoming at that time a positive stop equivalent to a holding pawl. The opposite end of the drum shaft 10 is provided with a snail cam 32 (see Figs. 2, 4 and 5) which coöperates with a tappet arm 33 to advance the wiper 34 (Figs. 1 and 8) of the hour selecting switch. The hour selecting switch comprises a bank of twenty-four stationary contacts 35 arranged in a circle within the radius of the wiper 34, which may be brought into engagement with each of the contacts in turn. The wiper 34 has depending spring arms 36 which are always in contact with the common ring 37, so that each of the contacts 35 may be brought into circuit with the common ring 37. The wiper 34 is mounted on a shaft 38, and is controlled through the operation of the tappet 33, and the ratchet wheels 39 and 40, which are secured thereto but insulated therefrom. The ratchets 39 and 40 face in opposite directions and are engaged by pawls 42 and 43 respectively. The pawl 42 which is held in place by the spring 44 forms the advancing pawl and the pawl 43, which is rigidly attached to the main body of the tappet 33, forms an overthrow preventing device. The tappet 33 is formed with the square shoulder 45 to allow a quick drop off the peak of the cam when the revolution of the shaft 10 has been completed. A spring 46 normally presses the arm 33 against the cam 32, tending to rotate it in a counter clockwise direction. A stop 47 is provided for preventing excessive clockwise rotation when the pawls are released from the ratchets for setting the wiper 34 as will be described later.

The shaft 38 bears a double snail cam 48 for operating the spring pressed arm 49 pivoted at 50 to the side plate 5. A tappet 52 mounted on the arm 49 engages the snail cam 48 and imparts an intermittent motion to the arm 49, which is controlled by the spring 53. Upon the end of the arm 49 a spring pressed pawl 54, and a fixed pawl 55' are mounted. The pawls 54 and 55' are similar to the pawls 42 and 43 for the hour selecting switch, and engage oppositely facing ratchets 55 and 56 respectively. These ratchets are mounted on a shaft 57 which passes through the side plate 5, and is attached at the outer end to the half day switch wiper 58, which plays over a series of contacts 59 arranged in a circular bank similar to the contacts 35. The wiper 58 is also provided with depending spring arms 60 for maintaining constant contact with the common ring 62 mounted on the face of the half day selecting switch.

Suitable holding pawls 63 and 64 are mounted on a common pin 65 and held by a spring 66 to prevent backward rotation of the switch wipers 34 and 58, when the pawl mechanism is operated. A handle or thumb piece 67 is attached to the end of the arm 49 and may be depressed to release the advancing pawls 54 and 42 from their respective ratchets, in order to allow setting of the wipers. For this purpose a pin 68 mounted on the tappet 52 is arranged to engage an extension 69 on the arm 33, when the thumb piece is depressed.

Figure 2:
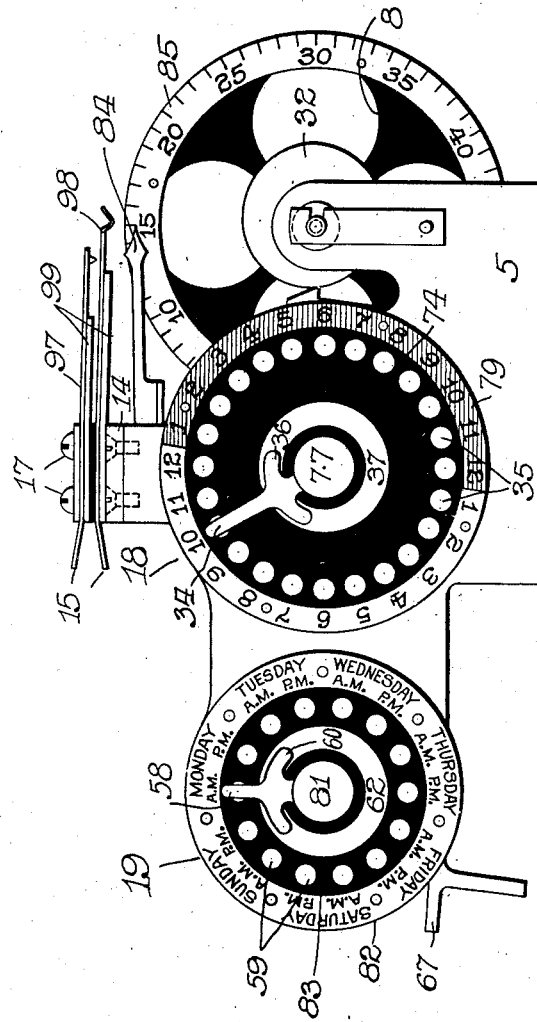
Fig. 2 is an end elevation viewed from the left of Fig. 1.

The hour selecting switch is shown in detail in Fig. 8, which indicates the manner in which the wiper 34 is secured to the ratchets 39 and 40. The ratchets are riveted to the cam 48 with spacing washers 72, interposed in order to space the teeth of the ratchet far enough apart to prevent interference of the pawls. A sleeve 70 formed integral with the cam 48 projects through a bearing 73 formed in the side plate 5, which bears the circular block of insulation 74. The shaft 38 comprises a collar bolt having part of its shank squared in order to prevent relative rotation between it and the sleeve of insulation 75 interposed between the shaft 38 and the sleeve 70. The wiper 34 is gripped between the collar 76 and the knurled thumb nut 77, which is screwed to the end of the shaft 38. A circular dial 79 encircles the edge of the block of insulation 74, and indicates the connection of the various contacts 35. Half of the dial is blackened to indicate the afternoon hours. The construction of the switch 19 is similar to that of the switch 18, with the exception that the sleeve 70 is omitted, the ratchet 55 being formed with a collar 80 projecting therefrom. A dial 82 is arranged to encircle the edges of the block of insulation 83, and to serve as a convenient means for identifying the various contacts. The contacts 59 are fourteen in number corresponding to the half days per week. The dial 82 is provided with suitable legends as shown in Fig. 2.

The barrel and switches may be set by depressing the thumb piece 67 and moving the armature 24 to disengage the projection 27 from the teeth of the wheel 9. The nose of the pawl 25 is slightly inclined to allow a clockwise rotation of the drum, as shown in Fig. 3. The drum can then be set to the minute by means of the pointer 84 mounted on the frame, and the dial 85 mounted on the edge of the barrel. The wipers 34 and 58 may then be adjusted by means of knurled thumb nuts 77 and 81 to the hour and half day respectively. After the armature and the thumb piece have been released, suitable impulses through the electromagnets, as from a master clock, will then maintain all of the parts in synchronism. The contacts 59 of the half day selecting switch 19 are connected electrically to the outer ring of bridge pieces 86 on the half day cut out switch 20 (Fig. 13). The inner ring of bridge contacts 87 are all connected in multiple to a common return. These contacts are mounted in a disk of insulation 88 mounted upon a bracket 89, which, as shown in Fig. 1, is secured to the base 7. The switch is provided with a dial 90 bearing suitable legends corresponding to the half-days of the week. The bridge contact corresponding to any given half day may be connected to the common return by means of plugs such as shown in Fig. 11ª, these plugs being inserted in the seat formed between an outer contact 86 and an inner contact 87, and the bells may be prevented from ringing on any half day by withdrawing the corresponding plug 92.

The circuits controlled by the apparatus above described are set forth in Figs. 9 and 13. Each section of the barrel is insulated, and is connected to a common return by a spring 93 (see Fig. 9) bearing in a groove 94 (see Fig. 1). These several sections of the drum 1 are insulated from each other at their adjacent ends by a ring of insulation 96 which is clamped between the disk 8 by the screws 95 (Figs. 9 and 10). Each pair of springs 15 comprises an upper spring 97 and a lower spring 98. These springs may be stiffened by auxiliary spring pieces 99 as shown in Fig. 9.

The barrel 1 is provided with pins of different lengths for insertion in the holes 13. The pin 100 shown in Fig. 9, is a short metallic pin which makes contact with the spring 98 only. The pin is of insufficient height to press the spring 98 against the spring 97, and contact is therefore made between the spring 93, and the spring 98 only. The pin 101 is a metallic pin of a height sufficient to bring the spring 98 into contact with the spring 97. Contact is thus made between the spring 93 and the springs 98 and 97 through the metallic barrel. The pin 102 is of approximately the same height as pin 101, but the top thereof is formed of insulating material and when pin 102 passes beneath the springs 97 and 98 they are brought into contact, thus closing a circuit through the springs only and not through the barrel. All the springs 97 corresponding to one section of the barrel, are in multiple together, and connected by a wire 103 through a relay 104 to the common return 105, which is controlled by the wiping contact 106 of the master clock 107, shown diagrammatically in the lower left hand corner of Fig. 13. This wiping contact controls a connection to the battery B over the wire 108. The relay 104 controls one set of signals $S^1$, as will be described later. The common spring 93 is connected through the relay 110 over the common return 105 to the wiping contact 106 of the master clock in the same manner as the relay 104. It can now be seen that if battery B be connected to either the spring 93 or any of the springs 97, the corresponding relays 110 or 104 will be operated. If a short metallic pin 100 be placed so as to make contact with the spring 98, the relay 110 will be energized to close the circuit of the signals $S^2$. If a long metallic pin 101 be employed, both the relays 104 and 110 will be energized, and the circuit of signals $S^1$ and $S^2$ will be closed. If an insulated pin 102 be employed, the circuit of 104 alone will be closed, thus operating only the signals S¹. It can thus be seen that either set or both sets may be operated at any given minute, as may be desired.

The master clock 107 is provided with a pair of contacts 112, which serve to advance the barrel sections. This is accomplished by means of the relay 113, the circuit of which is closed through the following: battery B; wire 108; contacts 112; relay 113; wire 114, back to battery B over wire 109. The relay 113 closes the contacts 115 for the barrel magnets 12 shown at the upper right-hand corner of Fig. 13, the circuit for the barrel magnets being closed as follows: battery B; wire 108; contacts 115; wire 116; magnets 12; wire 117, and back to battery B over wire 109. This serves at every minute to advance the barrel by one step. The contact 106 is closed for three seconds or a similar short period of time several seconds after the contact 112 is closed, so that the ringing relays will be energized for a short period after the contacts are closed at the springs 93, 97 and 98. The return to battery for the springs 93 and 97 is made over a plurality of paths, each of which is determined by the minute, the hour, and the day. The particular path is selected through the agency of the rows of holes 13, the hour selecting switch 18, the half day selecting switch 19 and the half day cut out switch 20. Assume for instance that it is desired to ring the bell S¹ at seven thirty Monday morning. An insulated pin as at 102 will be inserted at the thirty minutes mark, as shown at 117 on section A of the barrel. A pin 92 is inserted in cut out switch 20 between the contacts 86 and 87 to close the circuit for Monday a. m. The barrel section A is moved forward in synchronism with the master clock 107, until the switch wiper 58 of the half day selecting switch 19 rests upon the contact 59, corresponding to Monday a. m. The return circuit is then closed from battery by way of wire 109, through the half day cut out switch by means of the contact 87, plug 92 and contact 86 over the wire 118, connecting the half day cut out with the half day selecting contact 59, through the switch wiper 58, the connecting wire 119 between the common rings 62 and 37 of the switches 19 and 18 respectively to the wiper 34 of the switch 18. At seven o'clock on Monday morning, the wiper 34 will rest on the contact 35, numbered 7, on the left hand side of the switch 18. The circuit will still be open at the springs 97 and 98. The drum revolves in synchronism with the clock, and at seven thirty the pin 117 will be brought under the spring 98 and will close the contact between the springs 97 and 98. The circuit is then complete through the wire 120, contacts 97 and 98 and wire 103, through the relay 104 to the master clock contacts 106, which will now be closed for three seconds to the battery wire 108, thus energizing the relay 104 to ring the bells S¹, as was previously determined. To ring the bells S² at this time, would have required a short metallic pin 100 at the point 117, on the cylinder A. In this case, the relay 110 would have been energized instead of the relay 104, and if it were desired to ring both bells, it would be necessary only to substitute a metallic pin 101 at the point 117. It can be seen that in this manner either one of the signals or both may be operated at any given minute in the week. It can also be seen that the signals may be omitted for any one or more half days of the week, by withdrawing the plugs 92, thus cutting off the common return 109 for such period of time.

In Figs. 14 and 15, I have shown a modified form of a code ringing device. In this modification, instead of employing the hour-selecting switch 18 to select the pair of contacts which will be in circuit with the relays, I employ an hour drum 120 having a plurality of knobs or projections 121 thereupon, corresponding to the various hours. This drum 120 carries as many helical rows of projections 121 as there are barrel sections. The drum is divided into twenty-four equally-spaced parts, and, if it is desired to ring the bells during only a part of the twenty-four hours to which these parts correspond, only the corresponding number of projections 121 will be placed on the drum. As may be seen in Fig. 15, I employ 16 projections only, as it is not desired to ring the bells during certain of the night hours. Instead of having the springs which control the circuits of the relays 104 mounted so as to strike the projecting pins on the barrel 1 at all times, these springs are mounted so that they are out of the path of the pins on the various sections of the barrel, but, as the drum 120 is turned, the projections 121 will be brought against insulated pins 124. These pins are arranged to space the springs 122 and 123 and to form a means for bending them sufficiently to bring them into the path of the pins on the barrel sections. At the end of an hour, the drum 1 is advanced a complete revolution and the cam 32, operating through the tappet 33 and the pawl 42, advances the ratchet 39 one step. In the modification shown in Figs. 14 and 15, a gear wheel 125 is mounted on the end of the ratchet shaft. This gear wheel meshes with a gear wheel 126 attached to the end of the shaft upon which the drum 120 is secured. In this manner, the drum 120 is advanced at hourly intervals so as to bring the next button 121 in engagement with the corresponding pin 124. In this manner, the hour-selecting switch is eliminated and, at the same time, the drag of the idle pins against the springs is prevented. It is very much easier to bend one spring inwardly each hour than to drag the drum 1 beneath the pressure of all the springs. It will also be noticed that one electrical contact, namely the contact at the hour-selecting switch 18, is eliminated, thereby securing a greater degree of certainty of action. The hour-selecting switch may be replaced by an index for indicating the position at which the drum 120 stands at any given time. The other details of the mechanism are substantially in accordance with the showing of the previous figures. The pointer 84, instead of being mounted on the bridge 14, may be secured to the end frame member 5.

In the diagram of Fig. 16, the hour-selecting switch 18 has been removed and the wire 119 connected to all the springs 123, which correspond to the springs 98 of Fig. 13, in multiple. The operation of the mechanism is substantially the same as that of the prior figures, except that the selection of the hour contacts is purely mechanical instead of electrical, that is, the proper hour springs are moved into engagement instead of connected into a proper circuit.

The section B of the barrel controls the signals $T^1$, $T^2$ in a manner similar to the signals $S^1$, $S^2$ controlled by the section A. The signals $S^1$, $S^2$, may be placed in a different building or different buildings from the other signals, or by arranging any combination of the signals $S^1$, $S^2$ and $T^1$ and $T^2$. I may transmit further intelligence through a prearranged code, the signals in each case being bridged across the battery through the contacts of the respective relays. It will be clear from the above description and statement of operation, that by the use of my apparatus a signal or a combination of signals may be rung at any minute of the day or night, as desired, and that the signals for any given half day or days may be omitted.

The barrel may consist of as many sections as is found desirable, and by increasing the number of sections, I am able to transmit various combinations of signals which may convey various information through prearranged codes. Numerous modifications will at once be apparent to those skilled in the art, and I do not desire to be limited to the exact details of construction, and intend in the above specification, and in the following claims, that all such modifications and equivalents come within the spirit and scope of my invention.

What I claim is the following:

1. In combination, a barrel, means for advancing said barrel at regular time intervals, a plurality of circuits, springs in said circuits, said springs connected to stationary hour contacts, a wiper for making electrical connection with said stationary contacts, said wiper moving synchronously with said barrel, a second wiper connected to said first wiper, a bank of half day contacts for said wiper, a plurality of half day switches connected to said half day contacts, all of said switches having a common connection, and projections on said barrel for closing contact through said springs.

2. In combination, a bank of stationary hour contacts, a wiper movable to make selective contact with said hour contacts, a bank of stationary half day contacts, a wiper for selectively engaging said half day contacts, a connection between said wipers, a plurality of switches connected to said half day contacts, said switches having a common return, springs connected to said hour contacts, said springs having a common return to battery, signals connected to said springs, and mechanism for moving said barrel and said wipers synchronously.

3. In combination, a metallic barrel, a plurality of sockets in said barrel arranged in rows, a pair of springs adapted for contact with each other for each row of sockets, a signal circuit connected to one of all of said pairs of springs, a separate circuit grounded with said barrel, a signal in said barrel circuit, pins in said sockets for closing the circuit between said pairs of springs independently of said barrel circuit, and other pins in said socket for closing said barrel circuit through one of each of said pairs of springs.

4. In combination, a metallic barrel, a plurality of sockets in said barrel arranged in rows, a pair of springs for each row of sockets, a signal connected to one of each of said pairs of springs, a circuit grounded with said barrel, a signal in said grounded circuit, pins in said sockets for closing contact between said pairs of springs only, other pins for closing circuit between said barrel and said pairs of springs, a bank of hour contacts, the other spring of each pair being connected to said hour contacts, and a wiper movable in synchronism with said drum for engaging with said contacts.

5. In combination, a metallic barrel, a plurality of pairs of contact springs, means on said barrel for controlling said pair of springs, a circuit grounded to said barrel, a signal circuit controlled by said pairs of springs, a signal controlled by said grounded circuit, stepping mechanism for advancing said barrel, said means being operable to close either of said circuits, an electric clock for operating said stepping mechanism at regular recurring intervals, said clock having passing contact mechanism for closing the circuits of said signals.

6. In combination, a metallic barrel, a plurality of pairs of contact springs, a signal circuit grounded with said barrel, a signal circuit controlled by said pairs of springs independently of the grounded circuit through said barrel, means on said barrel for closing contact between said pairs of springs only and other means for grounding said springs to said barrel to close the circuits of both of said signals.

7. In combination, a metallic barrel, a plurality of pairs of contact springs, a contact in circuit with said barrel, a signal circuit controlled by each of said pairs of springs, an independent signal circuit controlled by the circuit through said barrel contact, means on said barrel for closing contact between said pairs of springs independently of the circuit through said barrel contact, other means for closing contact between said pairs of contacts and said barrel contact to close the circuit of both of said signals, stepping mechanism for advancing said drum, and an electric clock for operating said stepping mechanism at regular intervals, said clock having passing contact mechanism for closing the circuits of said signals.

8. In combination, a metallic barrel, a plurality of pairs of contact springs, a contact in circuit with said barrel, a signal circuit controlled by said pairs of contacts, a signal circuit controlled by said barrel contact, contact pins on said barrel for closing circuit through one of said signals, other contact pins for closing circuit through the other of said signals and contact pins for closing circuit through both of said signals.

9. In combination, a metallic barrel, a plurality of pairs of contact springs, a contact in circuit with said barrel, a signal circuit controlled by one of said pairs of contacts, a signal circuit controlled by said barrel contact, contact pins on said barrel for closing circuit through one of said signals, other contact pins for closing circuit through the other of said signals, contact pins for closing circuit through both of said signals, a time clock having a contact governing said signal circuits, and contact mechanism controlling the advance of said barrel.

10. In combination, a metallic barrel, a plurality of pairs of springs, a contact in circuit with said barrel, a working circuit controlled by one of said pairs of springs, a working circuit controlled by said barrel contact, pins on said barrel for closing circuit through one of said working circuits, other contact pins for closing circuit through the other of said working circuits, contact pins for closing circuit through both of said working circuits simultaneously, and time controlled mechanism for determining the pair of springs to be brought into circuit.

11. In combination, a metallic barrel, a plurality of pairs of contact springs, a contact in circuit with said barrel, a working circuit controlled by one of said pairs of contacts, a working circuit controlled by said barrel contact, projections on said barrel for closing circuit through one of said working circuits, other projections for closing circuit through the other of said working circuits, other contact projections for closing circuit through both of said working circuits simultaneously, a bank of contacts having connection with one of each of said pairs of springs, a wiper for engagement with said contacts, a time clock having a contact governing said working circuits, and contact mechanism controlling the advance of said barrel and of said wiper.

12. In combination, a metallic barrel, a plurality of pairs of contact springs, a spring in circuit with said barrel, a plurality of relays, a relay circuit controlled by each of said pairs of springs, contact projections on said barrel for closing circuit through one of said relays, other projections for closing circuit through another of said relays, other contact projections for closing circuit through both of said relays simultaneously, a bank of contacts having connection with one of each of said pairs of springs, a wiper for engagement with said contacts, a bank of half day contacts, each of said contacts being connected in multiple to a common return, a wiper for said half day contacts, said wiper connected to said first wiper, a time clock having a contact governing said relay circuits and contact mechanism controlling the advance of said barrel and of said wipers.

13. In a device of the character described, a barrel, a magnet, a toothed wheel attached to said barrel, an armature for said magnet, a pawl carried by said armature for engagement with said toothed wheel, a second pawl pivoted adjacent said first pawl and movable independently of said first pawl and having a tail extending into the path of said armature, said second pawl being normally out of engagement with said toothed wheel, engagement of said armature with the tail of said pawl casting said pawl into the teeth of said wheel only at the completion of the advancing movement for preventing overthrow.

14. In a device of the character described, a barrel, a magnet, a toothed wheel attached to said barrel, an armature for said magnet, a pawl carried by said armature for engagement with said toothed wheel, a second pawl pivoted adjacent said first pawl and movable independently of said first pawl and having a tail extending into the path of said armature, said second pawl being normally out of engagement with said toothed wheel, engagement of said armature with the tail of said pawl casting said pawl into the teeth of said wheel only at the completion of the advancing movement for preventing overthrow, a spring tending to hold said armature pawl in engagement with said wheel, a catch on said armature for engagement with said teeth and a spring for holding said armature out of engagement with said magnet.

15. In a program device, a signal, a movable carrier, projections on said carrier, relatively stationary brushes coöperating with said projections to close circuit through said signal, means to move said carrier to bring said projections against said springs at the rate of one per minute, an hour selecting switch connected in series with said brushes and signal and a half day selecting switch connected in series with said brushes, said switches being shifted by movement of said carrier.

16. In combination, a signal circuit, a plurality of pairs of normally open contacts, said signal circuit having connection with one of each of said pairs, a barrel, pins on said barrel for successively closing said pairs of contacts, time controlled means for moving said barrel, an hour selecting switch connected in series with each of the other said pairs of contacts, a half day selecting switch connected with said hour switch, a half day cutout switch connected with said half day selecting switch and a time controlled contact for closing said signal circuit momentarily.

17. In a program device, a barrel comprising a plurality of cylindrical metal sections, a shaft for supporting said sections, insulation for electrically separating said sections and said shaft, a plurality of perforations arranged in rows on said sections, pins in said perforations, a spring in contact with each section, a plurality of pairs of springs, each pair coöperating with the pins in one of said rows of perforations, said pins being of different lengths in order to close different circuits through only one of said springs and said barrel, or through a pair of said springs.

18. In a program device, a base, standards carried by said base, a barrel supported in said standards, an hour selecting switch, a wiper for said switch, a ratchet for advancing said wiper, a cam on said barrel shaft, an advancing pawl actuated by said cam, said advancing pawl adapted to engage said ratchet, a second ratchet connected to said switch wiper, an overthrow preventing pawl attached to said advancing pawl and adapted to engage said second ratchet and a holding pawl coöperating with said first ratchet.

19. In a program device, a base, standards carried by said base, a barrel supported by said standards, an hour selecting switch having a plurality of contacts and a movable wiper, a snail cam movable with said barrel, a pawl and ratchet for advancing said wiper, a snail cam connected with said wiper, a day selecting switch having contacts, and a movable wiper, pawl and ratchet means operated by said second snail cam for moving said day selecting wiper, and means for releasing both of said pawl and ratchet means simultaneously, whereby said hour selecting switch and said day selecting switch may be independently adjusted.

20. In combination, a movable barrel, a plurality of sockets in said barrel, pins mounted in said sockets, brushes adapted to be engaged by said pins, a working circuit connected to said brushes, said brushes being normally inoperable to close said circuit when engaged by said pins, and electric switch means operating synchronously with said barrel for selectively energizing said brushes to render them operable to close said circuit when engaged by said pins.

21. In combination, a rotatable barrel, a plurality of rows of sockets arranged circumferentially around said barrel, said rows corresponding to hours, the individual sockets corresponding to minutes, pins mounted in said sockets, brushes for each row of sockets, said brushes adapted to be engaged by said pins, a working circuit connected to said brushes, said brushes being normally inoperable to close said circuit when engaged by said pins, and electric switch means operating synchronously with said barrel for selectively energizing said brushes to render them operable to close said circuit when engaged by said pins.

22. In a program device, a rotatable barrel, a plurality of rows of sockets arranged circumferentially around said barrel, said rows corresponding to hours, the individual sockets corresponding to minutes, pins mounted in said sockets, a plurality of pairs of brushes, one pair for each row of sockets, a first working circuit connected between said pairs of brushes, a second working circuit connected to said brushes and being grounded through said barrel, said brushes being normally inoperable to close either of said circuits when engaged by said pins, and electric switch means operating synchronously with said barrel for selectively energizing said brushes to render them operable to close said circuits when engaged by said pins, said pins being interchangeable for selectively energizing either of said working circuits.

23. In combination, a barrel having a plurality of rows of sockets, the rows corresponding to consecutive hours, and the individual sockets corresponding to minutes, a plurality of pins for said sockets, a pair of springs for each row of sockets, one of each pair of springs being connected together in multiple, a circuit connected to said interconnected springs, said springs normally inoperable to close said circuit, and means operating synchronously with said barrel to render said pairs of springs successively operable to close said circuit.

24. In combination, a barrel having a plurality of rows of sockets, pins for said sockets, a plurality of pairs of springs, each pair corresponding to a row of sockets, one of each pair of springs being connected together in multiple, said springs being normally disengaged from said pins but being relatively movable to engage said pins, a selecting drum having a plurality of projections thereupon, means to move said barrel, and said drum synchronously to cause said projections to move said springs into engagement with said pins.

25. In combination, a barrel having a plurality of rows of sockets, a plurality of pairs of springs corresponding to said rows of sockets, the corresponding springs of each pair being connected together, interchangeable pins for said sockets, said springs being normally out of range of said pins, and means for moving said pairs of springs successively into the range of said pins.

26. In combination, a barrel having a plurality of rows of sockets thereupon, said rows corresponding to hours, and the individual sockets corresponding to minutes, a plurality of pairs of springs normally out of range of said pins, the corresponding springs of each pair being connected together, an insulating pin connected to and spacing said springs, a selecting drum driven by said barrel, means on said drum for engaging said pin to bring said springs selectively within the range of said pins.

27. In combination, a time controlled barrel having a plurality of rows of contact pins, a plurality of pairs of springs corresponding to said rows of pins, said pins adapted to make contact between each pair of springs, a circuit for said springs, said springs being normally inoperable to close said circuit, said circuit including a signaling device, a half-day selecting switch in said circuit, a half-day cutout switch in said circuit, and means for successively bringing said pairs of springs into action to close their corresponding circuits.

28. In combination, a time controlled barrel, a plurality of rows of pins on said barrel, a plurality of pairs of springs, each pair of springs corresponding to a row of pins, a signal circuit connected to said barrel, a signal circuit for said pairs of springs, said latter signal circuit being adapted for energization independently of the signal circuit connected through said barrel, said springs being normally inoperable to close said circuits, and means controlled by said barrel for rendering said pairs of springs successively operable to close the corresponding circuit, the pins on said barrel being interchangeable to selectively energize one or both of said signal circuits.

29. In a program device, a time controlled metallic barrel, a plurality of projections on said barrel, a pair of coöperating contact brushes adapted to be engaged by said projections, certain of said projections being relatively short for closing a grounded circuit between one of said brushes and said barrel, other of said projections being relatively long for closing said grounded circuit and a second circuit included between said pair of brushes.

30. In a program device, a time controlled metallic barrel, a plurality of projections on said barrel, a pair of coöperating contact brushes adapted to be engaged by said projections, certain of said projections adapted for closing a grounded circuit between one of said brushes and said barrel, other of said projections having insulated portions for closing a second circuit between said pair of contact brushes only.

In witness whereof I hereunto subscribe my name this 17th day of May, A. D. 1917.

ALFRED L. SOHM.